P. S. CRAWFORD.

Device for Tightening Wire-Fences.

No. 6,546. Reissued July 20, 1875.

*Witnesses:*

Frederick A. Herring

A. H. Barry

*Inventor:*

Peter S. Crawford

By Gridley & Warner his Attys

UNITED STATES PATENT OFFICE.

PETER S. CRAWFORD, OF UNION, ILLINOIS.

IMPROVEMENT IN DEVICES FOR TIGHTENING WIRE FENCES.

Specification forming part of Letters Patent No. 54,119, dated April 24, 1866; reissue No. 6,546, dated July 20, 1875; application filed June 21, 1875.

*To all whom it may concern:*

Be it known that I, PETER S. CRAWFORD, of Union, in the county of McHenry and State of Illinois, have invented a new and useful Improvement in Device for Tightening Wire-Fences; and I do hereby declare that the following is a full, clear, and exact description thereof, which will enable others skilled in the art to which my invention appertains to make and use the same, reference being had to the accompanying drawing forming a part hereof, and in which—

Figure 1:
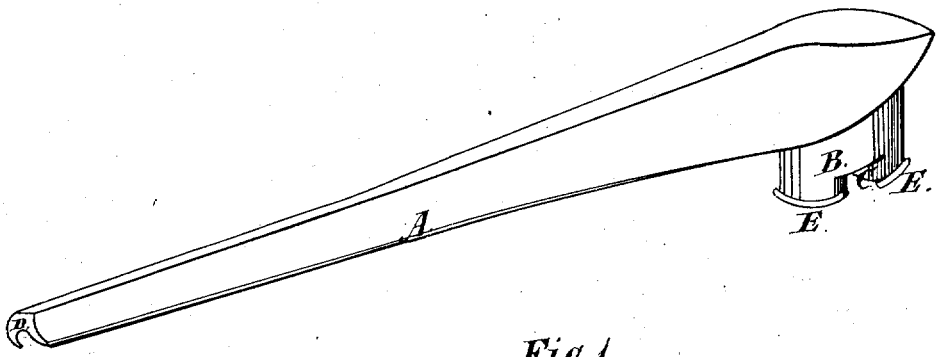
Figure 2:
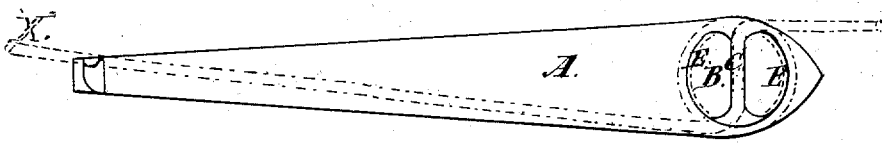

Figure 1 is a perspective view of my device for tightening wire-fence, and Fig. 2 is a view of the under side of the same.

Like letters of reference indicate like parts.

The object of my invention is to construct a device by means of which the wires of a fence can be readily and conveniently tightened without loosening the ends of the wires from the posts to which they are fastened, and so that the device may be attached to each wire of the fence and operated at any time in drawing the wire tight when the same has become loosened.

In the drawing, A represents the lever, which is made, preferably, with three longitudinal faces, or triangular in form, for the purpose of securing as much strength as possible from a small amount of metal, and is made wider at or near one end than at the other end thereof, for the purpose of supporting the spool or drum B. To the smaller end of the lever A is attached the hook D, for the purpose of securing the lever to the wire after the wire has been tightened, as hereinafter specified.

The diameter of the spool or drum B, which is attached to the under side of the lever, is a little smaller than the width of the lever. In the lower end of the spool or drum B is a slot, C. The corners of the spool or drum B adjoining the slot C are made circular, for the purpose of preventing the wire from being broken when being wound around the spool or drum during the process of tightening the wire.

I construct the spool or drum B, preferably, with rims E at the lower end of the spool, and terminating at the circular parts of the slot C, for the purpose of preventing the wire from becoming detached from the spool or drum B when the device is in use; but I do not regard the rims E as essential to a complete working of my device.

The device as a whole is made, preferably, of cast-iron, it being the cheapest material.

In use, one of said devices is applied to each wire of the fence, at intervals of about forty rods, having reference to the slack of the wire, by placing the wire to be tightened, at or near the center of its length, in the slot C and turning the lever A, so as to wind the slack wire upon the spool or drum B, and until the wire is strained to the required or desired tension, when the hook D is adjusted upon said wire, and so as to retain the device securely thereto.

If the wire should become loosened, the operation, as described, can be repeated until the wire is again tightened, as desired.

The lines X represent the wire adjusted in the slot C and wound around the spool or drum B in the position that it occupies after the wire has been tightened.

Having thus described my invention, what I claim as new, and desire to secure by Letters Patent, is—

1. The lever A, provided with a slotted spool or drum and with a hook, substantially as and for the purpose specified.

2. The lever A, provided at one end with the slotted spool or drum B, with the rims E, and at the other end with the hook D, substantially as and for the purpose specified.

PETER S. CRAWFORD.

Witnesses:

W. H. SANFORD,

J. A. PARRISH.